United States Patent
Mayer et al.

(10) Patent No.: US 9,703,622 B2
(45) Date of Patent: Jul. 11, 2017

(54) DETECTION OF DATA CORRUPTION IN A DATA PROCESSING DEVICE

(71) Applicants: Florian Mayer, Munich (DE); Frank Steinert, Rosenheim (DE)

(72) Inventors: Florian Mayer, Munich (DE); Frank Steinert, Rosenheim (DE)

(73) Assignee: NXP USA, INC., Austin, TX (US)

( * ) Notice: Subject to any disclaimer, the term of this patent is extended or adjusted under 35 U.S.C. 154(b) by 14 days.

(21) Appl. No.: 14/898,278

(22) PCT Filed: Jun. 18, 2013

(86) PCT No.: PCT/IB2013/054973
§ 371 (c)(1),
(2) Date: Dec. 14, 2015

(87) PCT Pub. No.: WO2014/203030
PCT Pub. Date: Dec. 24, 2014

(65) Prior Publication Data
US 2016/0132374 A1    May 12, 2016

(51) Int. Cl.
*G11C 29/00*     (2006.01)
*G06F 11/07*     (2006.01)
*G06F 11/10*     (2006.01)

(52) U.S. Cl.
CPC ........ *G06F 11/079* (2013.01); *G06F 11/0751* (2013.01); *G06F 11/1004* (2013.01)

(58) Field of Classification Search
CPC . G06F 11/079; G06F 11/1004; G06F 11/0751
See application file for complete search history.

(56) References Cited

U.S. PATENT DOCUMENTS

| | | |
|---|---|---|
| 5,978,814 A | 11/1999 | Miller et al. |
| 6,895,508 B1 | 5/2005 | Swanberg et al. |
| 6,941,473 B2 | 9/2005 | Etoh et al. |
| 6,996,677 B2 | 2/2006 | Lee et al. |
| 7,287,140 B1 | 10/2007 | Asanovic et al. |
| 7,930,491 B1 | 4/2011 | Xu et al. |
| 2006/0053182 A1 | 3/2006 | Sen et al. |

(Continued)

FOREIGN PATENT DOCUMENTS

| | | |
|---|---|---|
| JP | 2005209178 | 8/2005 |
| JP | 2007199845 | 8/2007 |

(Continued)

OTHER PUBLICATIONS

International Search Report and Written Opinion correlating to PCT/IB2013/054973 issued on Mar. 27, 2014.

(Continued)

*Primary Examiner* — Sam Rizk

(57) ABSTRACT

A method of operating a data processing system comprises: processing data words and switching between contexts; assigning a context signature Sig to any pair formed of a data word and a context; reading, within a current context, a data record from a memory unit, the data record comprising a payload data word and a protection signature; providing, as a verification signature, the context signature Sig of the payload data word and the current context; checking the verification signature against the protection signature; and generating an error signal if the verification signature differs from the protection signature.

14 Claims, 3 Drawing Sheets

(56) References Cited

U.S. PATENT DOCUMENTS

| | | |
|---|---|---|
| 2006/0136780 A1 | 6/2006 | Meng et al. |
| 2007/0111836 A1 | 5/2007 | Kwon et al. |
| 2008/0133929 A1 | 6/2008 | Gehrmann et al. |
| 2009/0125623 A1 | 5/2009 | Garg et al. |
| 2010/0017660 A1 | 1/2010 | Tilton et al. |
| 2011/0126065 A1 | 5/2011 | Bancel et al. |
| 2013/0055025 A1 | 2/2013 | Feix et al. |
| 2013/0086393 A1 | 4/2013 | Pogmore |

FOREIGN PATENT DOCUMENTS

| | | |
|---|---|---|
| KR | 20060069041 | 6/2006 |
| KR | 20080104591 | 12/2008 |

OTHER PUBLICATIONS

England, D.M. "Capability concept mechanisms and structure in system 250", Plessy Telecommunications Research, Maidenhead, GB, in Proceedings of the International Workshop on Protection in Operating Systems. IRIA, 1974.

DETECTION OF DATA CORRUPTION IN A DATA PROCESSING DEVICE

FIELD OF THE INVENTION

This invention relates to a data processing device and to a method of operating a data processing system.

BACKGROUND OF THE INVENTION

Data processing systems, such as microcontrollers, personal computers and computer networks are usually provided with some form of safety mechanism to ensure the integrity of data in the data processing device. Data stored in a data processing device may be vulnerable for a variety of reasons. For example, the status of a bit in a memory register may change in an unpredictable manner due to, for example, particle impact from, e.g., radiation. Furthermore, the status of individual bits or entire registers may be accidentally changed by faulty software. A third kind of risk may be produced by malicious software.

A context is a set of data associated with a task on a data processing device. The data processing system may be designed such that any task is allowed to access its own context but not any other context. The data of a specific task may thus be shielded against other tasks. Switching from one task to another task may involve storing the context of the current task, so that the current task may be resumed at a later point in time. A task may be an entire program, a thread, a subroutine, a single instruction, or any other kind of process on the data processing system. A task switch may therefore also be referred to as a context switch.

Data processing devices may be subject to functional safety standards, such as ISO 26262 or IEC 61508. There is therefore a need for a reliable scheme of detecting data corruption, notably in components that are relevant for functional safety. As mentioned above, data may be corrupted by, e.g., faulty software components. Data may even be corrupted by a lack of cooperation between software components. For example, a stack frame generated by a certain context may be corrupted by another context due to faulty software. Accordingly, there is a particular need for detecting corrupted stack frames and for providing stack-frame protection. The data that may be corrupted may include executable data, i.e. program code. There is therefore a need for ensuring safe code execution.

SUMMARY OF THE INVENTION

The present invention provides a data processing device and method of operating a data processing system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
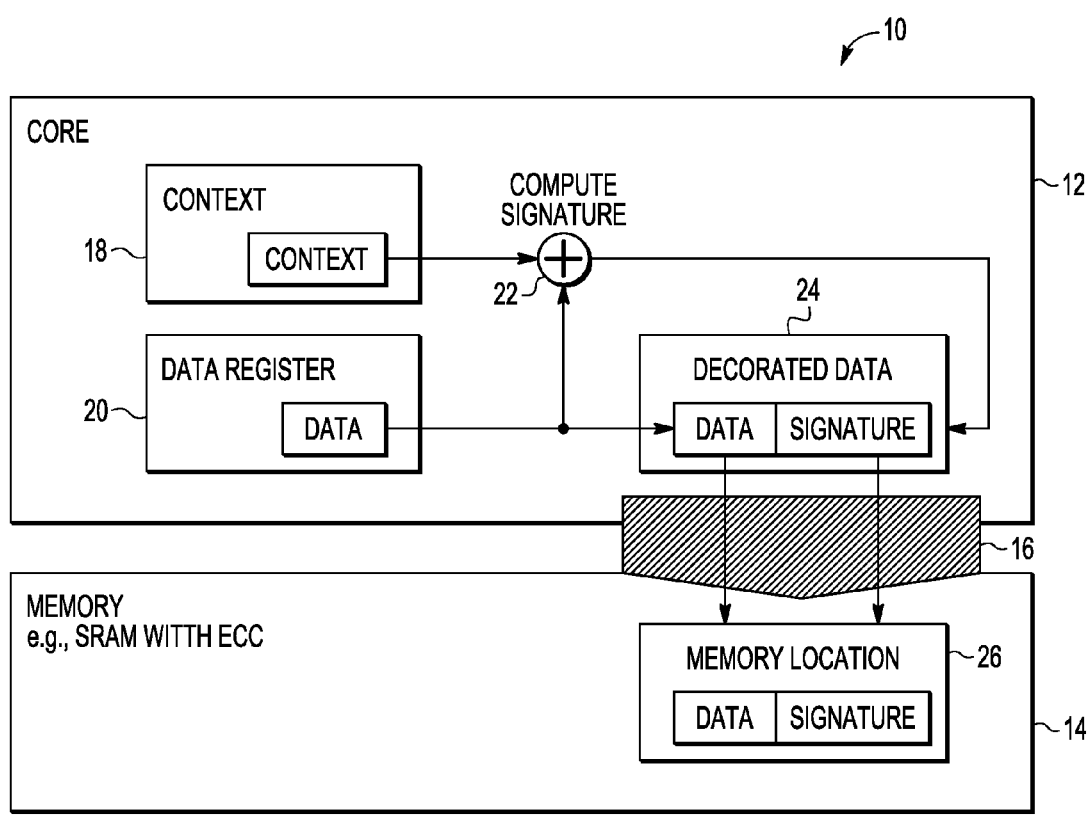
FIGS. 1 and 2 schematically illustrate an example of an embodiment of a data processing device.
Figure 2:
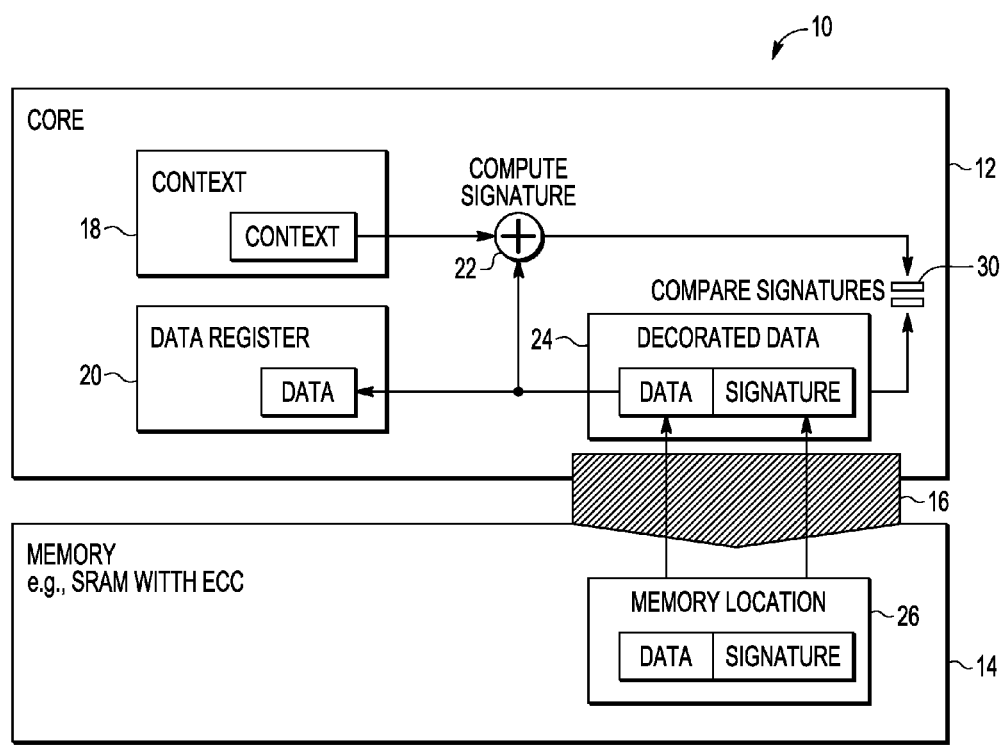

In the example of FIGS. 1 and 2, the data processing device 10 comprises a processing core 12 and a memory unit 14. The memory unit 14 may be connected to the core 12 via, e.g., a memory access controller 16 or any other suitable interface. The memory unit 14 may be composed of one physical memory unit or of more than one physical memory units. The one or more physical memory units may, for example, include a static random access memory unit (SRAM) or a dynamic random access memory unit (DRAM) or both. Although only one core 12 is shown in the figures, the processing device 10 may comprise two or more cores. The processing device 10 may notably comprise a context unit 18, an internal memory unit 20, a signature unit 22, a data protection unit 24, and a comparison unit 30. Each of these units may be provided either in hardware or in software or by a combination of both.

FIG. 1 illustrates an example of a write operation, while FIG. 2 illustrates an example of a read operation. The write operation (see FIG. 1) may involve a transfer of data from, e.g., the internal memory unit 20 to the memory unit 14. The write operation (see FIG. 2) may involve a transfer of data from the memory unit 14 to, e.g., the internal memory unit 20.

Referring now specifically to FIG. 1, the data processing device 10 may be arranged to operate as follows, for example. The context unit 18 may provide a context identifier for identifying a current context, i.e., the context of a task which is currently being executed by the data processing device 10. Different contexts may be identified by different context identifiers. Each context identifier may, for example, be represented by an alpha-numerical constant or by a constant bit sequence. The internal memory unit 20 may contain a certain data item "Data". The data item may be one data item among a large number of data items in the internal memory unit 20. The data item may, for example, be stored in a data register of the internal memory unit 20. The data item may be referred to as the payload data item to be distinguished from a protected or "decorated" data item that combines the payload data item and a protection signature in a single data item, as will be described further below.

The payload data item may notably be a data word and may also be referred to as the payload data word. A data word is a group of bits that is handled as a unit by the data processing system in question. A data word may, for example, consist of 16, 32, 64, or 128 bits.

The innovation described herein is explained largely by making reference to a single payload data item. It is therefore pointed out that the data processing device may be arranged to process any other payload data item in the device analogously. The read and write operations on the payload data and the associated signature operations may notably be implemented in dedicated hardware or on an operating system level. It may thus be ensured that these operations cannot be deactivated or circumvented by any additional software on the data processing device.

The payload data item may be processed as follows in response to a write request. The signature unit 22 may provide a context dependent signature function. The signature function may, for instance, be a checksum function, a hash function, a fingerprint, a randomization function, or a combination thereof. For example, in an implementation in which the signature function is a checksum function, the signature unit 22 may be arranged to generate a checksum, using, e.g., a generating polynomial having context-dependent coefficients. The signature unit 22 may apply the signature function of the current context to the payload data item "Data" and thus generate a protection signature of the payload data item. The protection signature may thus depend on both the payload data item and the current context. More specifically, the signature function may depend on a context identifier of the current context. The protection unit 24 may temporarily store the payload data item "Data" and the associated protection signature "Signature" as a protected data item. The memory access unit 16 may further store the protected data item in the memory unit 14. Multiple payload data items from the core 12 may be stored at multiple memory locations 26 of the memory unit 14.

The context identifier may, for example, be an M-bit field and thus have two to the power M different possible values. For each of these values, the signature unit 22 may provide a different signature function. For instance, in an example in which the signature function is a 7-bit error correcting code (ECC), there may be 7!=5040 possible permutations of the ECC algorithm. The context identifier may in this case comprise at least 13 bits, so as to allow the selection of any combination among the 5040 different permutations.

Referring now to FIG. 2, two different scenarios for a read access to the memory unit 14 will be described below, namely a first scenario with a valid read access and a second scenario with an attempted invalid read access.

In the first scenario (valid read access), a payload data item and a corresponding protection signature have been stored at a certain memory location in the memory unit 14 within a first context, and a read access to that memory location is made within the same first context. The memory access controller 16 may retrieve the respective payload data item from the memory unit 14 along with its protection signature. The protection unit 24 may feed the payload data item "Data" to the signature unit 22, and it may feed the signature "Signature" to the comparison unit 30. The signature unit 22 may apply the signature function of the current context as indicated, for instance, by the context identifier to the payload data item received from the protection unit 24. The present read operation is assumed to be valid in the sense that the current context is the same as the context of the preceding write operation of the payload data item to the memory unit 14. In other words, the write access and the read access are in the present scenario performed within the same context. If the payload data item has not been corrupted while it was stored in the memory unit 14, applying the signature function of the current context will therefore yield a verification signature identical to the protection signature of the payload data item in the memory unit 14. The comparison unit 30 may compare the protection signature, i.e., the signature read from the memory unit 14, against the verification signature, i.e., against the signature that has been newly computed from the payload data item in dependence on the current context. If the verification signature matches the protection signature, the payload data item retrieved from the memory unit 14 may be further processed in a normal manner. If, however, the verification signature does not match the protection signature, this is an indication that the payload data item has been corrupted by, for instance, a neutron impact or an illegal access. A suitable error handling routine may then be triggered.

In the second scenario, the current context, i.e., the context of the read access, is not the context in which the payload data item was written to memory unit 14. As the signature function provided by the signature unit 22 is context-dependent, applying the signature function of the current context to the payload data item from the memory unit 14 may result in a verification signature that differs from the protection signature of the payload data item. To be precise, there may be a certain small likelihood that the verification signature and the protection signature are in fact equal, as the mapping of context identifiers and payload data items into signatures is not necessarily unique. In most if not all applications of practical interest, the signature of a payload data item may be much shorter (i.e., comprise far fewer bits) than the payload data item itself. However, when the read context differs from the write context, the probability of the verification signature matching the protection signature may be negligible. In other words, when the read context differs from the original write context, there may be a very high likelihood (e.g., greater than 99%) that the verification signature will differ from the protection signature. The comparison unit 30 may therefore be arranged to generate an error signal in response to any mismatch between the verification signature and the protection signature.

The payload data item may, for instance, comprise a total of 32 or 64 bits. The signature may comprise considerably less bits than the payload data item. A sufficient length of the signature may, for instance, be 3 bits or 4 bits.

It is noted that the proposed architecture may be similar to a conventional architecture in which a check sum is generated for a payload data item, and the payload data item and the corresponding check sum are stored together. In the present architecture, however, an additional degree of protection may be achieved by means of a signature that does not only depend on the respective payload data item but also on the current context.

Any payload data item may thus be associated or "decorated" with a signature based on a specific context. Any data manipulated or corrupted by a different context may therefore be likely to have a signature that does not fit to the original context owning the data. When the data is retrieved from within the original context, the corruption may be detected directly through hardware at no or very low penalty.

The hardware for implementing this scheme may comprise, for example, a so-called master, e.g., a microprocessor core or a direct memory access (DMA) controller, and a memory unit. The master may be arranged to provide the data to be written to the memory unit with a context dependent and data dependent signature. The memory unit may be arranged to store the payload data together with the signature. The memory unit may, for example, be an ECC enabled memory unit, e.g., an ECC enabled memory unit as known in the art. An exception flag may be raised if a mismatch between the stored signature (protection signature) and a recomputed signature (the verification signature) is detected upon retrieval of the payload data.

The reliability of the proposed protection scheme may depend on the granularity of the tasks. Subdividing a task into smaller tasks may result in more context switches and in a higher degree of protection. It may therefore be beneficial to implement different context modes, either on one and the same device or on different devices, in order to achieve a desired safety level. Each mode may refer to one specific context configuration and may own its own register set. For example, a first context mode may provide for basic stack protection only. In some systems, e.g., in Power PCs, this may be achieved by performing a context switch when the stack pointer changes. It is noted, however, that there are computer architectures, e.g., Intel, in which the stack pointer does not necessarily change only when a subfunction is called. On Intel systems, the stack pointer may, in fact, change every time a data item is stored on the stack. More generally, the context for providing stack frame protection may change in response to a branch-and-link operation and may be recovered on function return.

A second context mode may provide protection of local variables. A third context mode may provide protection of local variables and signed code execution, which means that only defined entry points of a program can be called.

To provide for stack frame protection, two context registers may be used. A first register may be designed to protect the actual stack frame. The context identifier may be increased on every branch and link instruction and decreased on, e.g., function return. In order to further improve safety, increasing and decreasing may be done via a configurable generator polynomial. Each task may have a different generator polynomial. A second register may define a context bound to the actual stack pointer for parameter passing. In order to pass a parameter to a subroutine, the context may be defined by the stack pointer of the callee and can be written by the caller.

To provide for protection of local memory, any value available to a specific software module for a context may be used. It may be combined with a modified destination address to improve safety. The modification may be defined via a generator polynomial.

Protection of shared memory may be achieved in a manner similar to the one for local memory, with the distinction that the context should be available to all partners.

Detection of runaway code may be achieved by encoding program code with a signature. Only execution from the correct context may then be possible. A generator polynomial may be used to increment the context identifier on instruction level.

Signed code execution may be achieved by maintaining a context via a generator polynomial on instruction level, similar to, e.g., the detection of runaway code. A program may define entry points which technically may be a publically available link-time start context. As soon an entry point starts execution, it may have its own private generator polynomial. Therefore, it may be impossible to enter this program at any address other than an entry point. Relative jumps within the same generator polynomial may be handled by hardware, e.g., by multiplication of the current context by the generator polynomial. Absolute jumps may be possible only with the knowledge of the context of the destination context, i.e., either within the compilation unit or to an entry point of another compilation unit.

Figure 3:
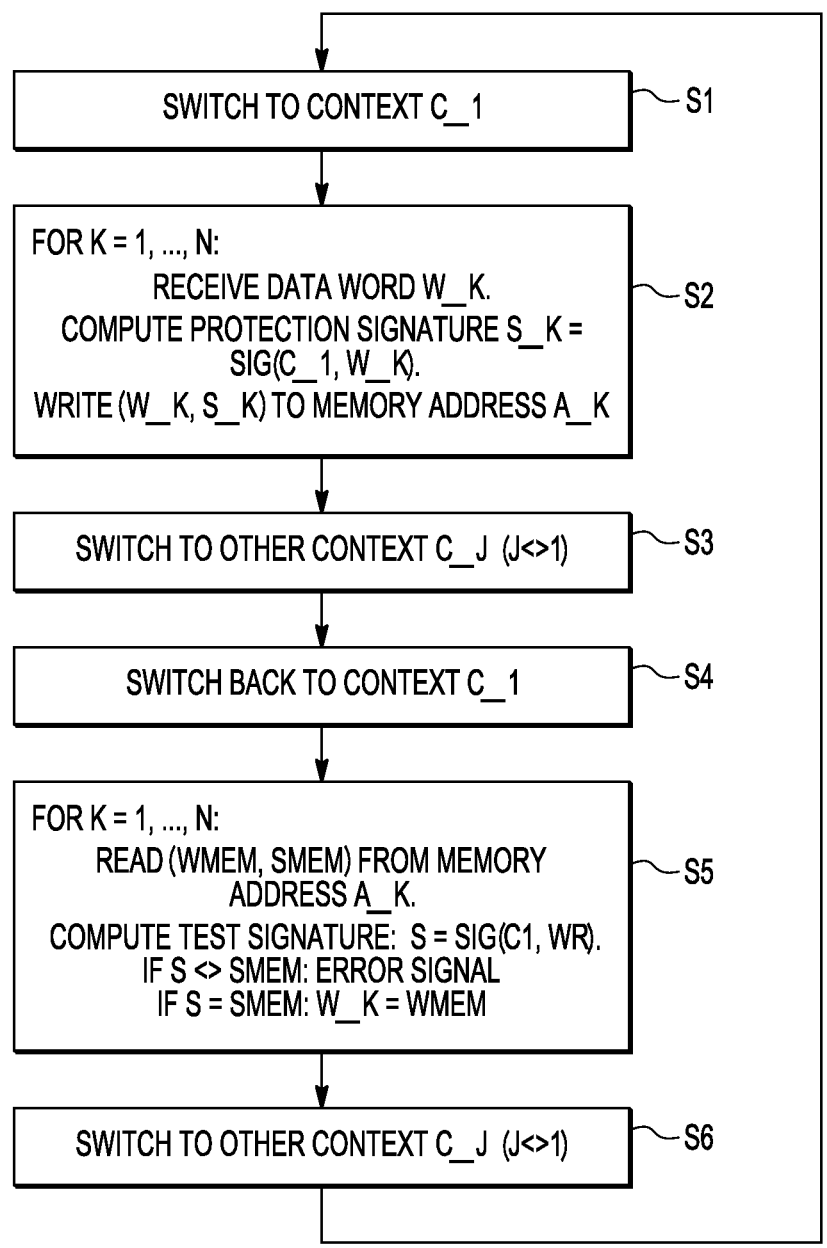
FIG. 3 shows a flow chart that schematically illustrates an example of an embodiment of a method of operating the data processing device.

Referring now to FIG. 3, a method of operating a data processing system is described. The method may be implemented, for example, by an operating system (OS) installed in the data processing system.

In block S1, the data processing system may switch to a context C1. A set of data words W_K (K=1 to N) may be received or generated within the context C1. For each of these data words (payload data items), a protection signature SK may be computed in dependence on both the current context (C1 in this example) and the respective data word. The pairs of data words and associated protection signatures may be written to memory addresses A_K (K=1 to N).

In subsequent block S3, the system may switch from the context C1 to another context. Further context switches may be included in block S3.

Eventually, the system may switch back to context C1 (block S4). Within this context C1, the content of the above-mentioned memory addresses A_K (K=1 to N) may be read. For each of these memory addresses, a verification signature may be computed by applying the signature function of the current context (i.e., context C1 in the present example) to the respective data words read from the memory addresses A_K. The thus generated verification signatures may be checked against the protection signatures read from the memory addresses A_K. An error signal may be generated and an error handling routine may be called in response to any mismatch between the verification signature and the protection signature of any one of the payload data items. Such mismatch may be due to an unallowed or accidental modification of the payload data at a certain memory address A_K. Eventually, another context switch may be performed (block S6) and the process flow may return to block S1.

The flow chart in FIG. 3 represents an example of a process flow that is regular insofar as the write and read operations (blocks S2 and S5) at the addresses A_K are performed within the same context. In contrast, omitting block S4 in FIG. 3 results in an example of an irregular process flow, namely, an example in which the write and read operations in blocks S2 and S5 are performed within different contexts. In this case, the verification signatures are very likely to differ from the protection signatures as a result of using a context-dependent signature function.

Thus, a data processing device capable of processing data words and of switching between contexts is proposed. The data processing device may comprise a signature unit 10, a memory access unit 16, and a comparison unit 30. The signature unit may be arranged to assign a context signature Sig(W, C) to any pair (W, C) formed of a data word W and a context C; wherein said data words and said contexts include a first data word W1, a first context C1, and a second context C2 different from the first context C1, and wherein the context signature Sig(W1, C1) of the first data word W1 and the first context C1 differs from the context signature Sig(W1, C2) of the first data word W1 and the second context C2. The memory access unit 16 may be arranged to read, within a current context CC, a data record from a memory unit 14. The data record may comprise a payload data word WR and a protection signature. The signature unit 22 may be arranged to provide, as a verification signature, the context signature Sig(WR, CC) of the payload data word WR and the current context CC. The comparison unit 30 may be arranged to check the verification signature against the protection signature and to generate an error signal if the protection signature and the verification signature differ. Thus, an illegal modification of the payload data word by a context other than the context from which the payload data word was written may be detected.

The signature unit 22 may be further arranged to provide, as a second protection signature, the context signature Sig(WW, CC) of a second payload data word WW and the current context CC, and the memory access unit 16 may be arranged to write a second data record to the memory unit 14, the second data record comprising the second payload data word and the second protection signature Sig(WW, CC). The second protection signature may be checked against a verification signature when the second payload data word is read from the memory unit.

The data words and contexts may include a second data word W2, a third data word W3, and a third context C3 and the context signature Sig(W2, C3) of the second data word W2 and the third context C3 may differ from the context signature Sig(W3, C3) of the third data word W3 and the third context C3. In other words, the context signature of a given context may depend on the data item that is to be protected by the context signature.

The context signature Sig(W, C) may be a context-dependent checksum of the data word W. For example, the signature unit 22 may be arranged to associate with each context a context-specific generator polynomial, and to generate the checksum Sig(W, C) on the basis of the generator polynomial.

In an alternative implementation, the context signature Sig(W, C) may depend on the context C but not on the data word W. In this case, the context signature is a function of only the context. The context signature may thus be generated in a particularly simple manner. The context signature Sig(W, C) may, for example, be an identifier of the context C. The identifier may, for example, be bit sequence comprising a fixed number of bits, e.g., three or four bits.

The data processing device may be arranged to execute a program comprising one or more subroutines and arranged to perform a context switch with each jump to or from a subroutine. Each subroutine (also referred to as a function) may thus have its data protected against access from other subroutines.

The payload data word WP may notably be an executable instruction. Signed code execution may thus be enabled. It is noted that the executable instructions and the associated context signatures may be generated on the data processing device in a configuration stage, e.g., when the device is not yet fully operational. In this case, the context signature of an instruction may be interpreted as the key to a future context from which the instruction may be called. In an embedded system, for instance, program code is usually loaded offline to the device. For example, in an embedded control unit, the program code may be flashed at production time. The context signatures may be computed by, e.g., a build system of a software development environment for that device.

The memory unit 14 may comprise a plurality of registers, each register arranged to store a payload data word along with a protection signature associated with that payload data word. Thus, the payload data word may be written and read simultaneously in a single operation.

The context signature (W, C) may have the same length for every data word W and every context C. For instance, it may have a length of three, four, or five bits. It may thus be stored conveniently.

In one example, different contexts have different signatures for any data word. A high degree of protection may thus be achieved. In another example, some contexts may have the same signature for a certain data word. The probability of such a coincidence may however be very low considering the total number of different contexts and data words.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, a payload data item and its protection signature may be stored in separate registers, although it may be convenient to store them in a single register.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the core 12, the memory unit 14, and the MAC 16 may be located on a single integrated circuit. Alternatively, the examples may be implemented as any number of separate integrated circuits or separate devices interconnected with each other in a suitable manner. For example, the core 12, the memory unit 14, and the MAC 16 may be implemented as separate devices. Furthermore, each of these devices may be implemented as single integrated circuit or comprise more than one integrated circuit.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A data processing device capable of processing data words and of switching between contexts, the data processing device comprises:
    a signature unit, wherein the signature unit is arranged to assign a context signature Sig to any pair formed of a data word and a context; wherein said data words and said contexts include a first data word, a first context, and a second context different from the first context, and wherein the context signature Sig of the first data word and the first context differs from the context signature Sig of the first data word and the second context;
    a memory access unit, wherein the memory access unit is arranged to read, within a current context, a data record from a memory unit, the data record comprising a payload data word and a protection signature;
    a signature unit, wherein the signature unit is arranged to provide, as a verification signature, the context signature Sig of the payload data word and the current context; and
    a comparison unit, wherein the comparison unit is arranged to check the verification signature against the protection signature and to generate an error signal if the protection signature and the verification signature differ.

2. The data processing device of claim 1, wherein
    the signature unit is further arranged to provide, as a second protection signature, the context signature Sig of a second payload data word and the current context; and
    the memory access unit is arranged to write a second data record to the memory unit, the second data record comprising the second payload data word and the second protection signature Sig.

3. The data processing device of claim 1, wherein said data words and said contexts include a second data word, a third data word, and a third context and the context signature Sig of the second data word and the third context differs from the context signature Sig of the third data word and the third context.

4. The data processing device of claim 1, wherein the context signature Sig is a context-dependent checksum of the data word.

5. The data processing device of claim 4, wherein the signature unit is arranged to associate with each context a context-specific generator polynomial, and to generate the checksum on the basis of the generator polynomial.

6. The data processing device of claim 1, wherein the context signature Sig depends on the context but not on the data word.

7. The data processing device of claim 1, wherein the context signature Sig is an identifier of the context.

8. The data processing device of claim 1, arranged to execute a program comprising one or more subroutines and arranged to perform a context switch with each jump to or from a subroutine.

9. The data processing device of claim 1, wherein said payload data word is an executable instruction.

10. The data processing device of claim 1, wherein the memory unit comprises a plurality of registers, each register is arranged to store a payload data word along with a protection signature associated with that payload data word.

11. The data processing device of claim 1, wherein the context signature has the same length for every data word and every context.

12. The data processing device of claim 1, wherein different contexts have different signatures for any payload data word.

13. A method of operating a data processing system, comprising:
processing data words and switching between contexts;
assigning a context signature Sig to any pair formed of a data word and a context; wherein said data words and said contexts include a first data word, a first context, and a second context different from the first context and wherein the context signature Sig of the first data word and the first context differs from the context signature Sig of the first data word and the second context;
reading, within a current context, a data record from a memory unit, the data record comprising a payload data word and a protection signature;
providing, as a verification signature, the context signature Sig of the payload data word and the current context;
checking the verification signature against the protection signature; and
generating an error signal if the verification signature differs from the protection signature.

14. The method of claim 13, further comprising:
providing, as a second protection signature, the context signature Sig of a second payload data word and the current context; and
writing a second data record to the memory unit, the second data record comprising the second payload data word and the second protection signature Sig.

* * * * *